United States Patent [19]

Marsh et al.

[11] Patent Number: 5,089,155

[45] Date of Patent: Feb. 18, 1992

[54] OVERBASED MAGNESIUM SULPHONATE COMPOSITION

[75] Inventors: John F. Marsh, Abingdon, United Kingdom; Marc R. M. Vernet, Andresy, France; Graham W. Hamey, Bradley, United Kingdom

[73] Assignee: Exxon Chemical Patents Inc., Linden, N.J.

[21] Appl. No.: 627,610

[22] Filed: Dec. 11, 1990

Related U.S. Application Data

[63] Continuation of Ser. No. 255,885, Oct. 11, 1988, abandoned.

[30] Foreign Application Priority Data

Oct. 12, 1987 [GB] United Kingdom .............. 87-23907
Mar. 23, 1988 [GB] United Kingdom .............. 88-06972

[51] Int. Cl.$^5$ ........................................ C10M 135/10
[52] U.S. Cl. .................................... 252/33.4; 252/39; 252/25; 252/33.3; 252/37.7
[58] Field of Search .................... 252/25, 33.3, 33.4, 252/39, 32.7 E

[56] References Cited

U.S. PATENT DOCUMENTS

| | | | |
|---|---|---|---|
| 3,772,198 | 11/1973 | Cease et al. | 252/33.4 |
| 3,857,790 | 12/1974 | Saunders et al. | 252/33.4 |
| 3,865,737 | 2/1975 | Kemp | 252/33.4 |
| 4,140,642 | 2/1979 | Kistler et al. | 252/33 |

FOREIGN PATENT DOCUMENTS 1103699 6/1981 Canada .
0001318 7/1978 European Pat. Off. .

*Primary Examiner*—Jacqueline V. Howard
*Attorney, Agent, or Firm*—J. B. Murray, Jr.

[57] ABSTRACT

Overbased magnesium sulphonates having increased resistance to interactions are prepared from sulphonic acids prepared from alkylates with long and medium chain alkyl groups. Compositions comprising such overbased magnesium sulphonate are particularly suitable for use in combination with high molecular weight dispersants and/or friction modifiers. Stable sediment-free lubricating oil compositions (including lubricants and concentrates therefor) can be prepared which can meet SG quality and the Tier II fuel economy requirements.

12 Claims, No Drawings

OVERBASED MAGNESIUM SULPHONATE COMPOSITION

This is a continuation of Ser. No. 07/255,885, filed Oct. 11, 1988, now abandoned.

This invention concerns overbased metal alkyl aryl sulphonate compositions, their use as an additive to lubricant oil, lubricant oils containing the compositions, and intermediates useful in the preparation of the compositions.

Overbased metal alkyl aryl sulphonates are known. The term "overbased" is used to describe a salt in which the metal is present in an amount greater than stoichiometrically required by the sulphonate groups present. Usually such overbased salts are prepared by treating a reaction mixture comprising an alkyl aryl sulphonic acid, a reaction medium consisting essentially of an organic solvent for the alkyl aryl sulphonic acid, a stoichiometric excess of a metal base, and a promoter with carbon dioxide. Examples of alkyl aryl sulphonic acids which have been overbased include mono-eicosane substituted naphthalene sulphonic acid, dodecyl benzene sulphonic acid, didodecyl benzene sulphonic acid, dinonyl benzene sulphonic acid, dilauryl beta-naphthalene sulphonic acid, n-octadecyl benzene sulphonic acid, a branched chain $C_{24}$ alkyl benzene sulphonic acid any many others.

It is also known that overbased metal alkyl aryl sulphonates are useful as detergent additives in lubricants which act, for example, to improve engine cleanliness. During the combustion of fuel, acidic substances are formed which can cause corrosion of the engine and oxidation of the lubricant which in turn may lead to formation of deposits. The high degree of alkalinity of overbased sulphonates can be used to neutralise these acidic substances and to avoid or at least strongly reduce the detrimental effects of acidity. The development of engines, and particularly diesel engines, places more demanding requirements on lubricant performance, and there is therefore a desire for improved overbased metal sulphonate compositions.

Lubricating oils for automobile are having to pass increasingly severe tests, usually engine tests, for approval by automobile manufacturers, and/or to meet industry standards. In particular, tests for sludge and varnish inhibition are becoming more severe requiring the use of more potent dispersants. The oils are also being required to be more resistant to thickening caused by oxidation, requiring the use of potent antioxidants. The SG quality level in the API Engine Service Categories for service station oils developed by API in conjunction with ASTM and SAE reflects this increased severity in requirements for passenger car applications. Additionally, there is a desire to improve the effect of lubricating oils on fuel economy requiring the use of friction modifier. API in conjunction with ASTM and SAE has developed a more stringent engine test (Sequence 6 Test) for determining fuel economy performance, and a pass at the so-called "Tier II" level of fuel economy for a lubricating oil requires a 2.7 percent minimum improvement in fuel economy versus a standard lubricating oil run in the Sequence 6 engine test.

The use of overbased magnesium sulphonates in lubricating oils designed to meet these more stringent criteria can give rise to problems of interactions between the additives, either in concentrated form or in the finished lubricants, which may result in undesirable sediment or haze formation. This invention relates to overbased magnesium sulphonates having increased resistance to interactions, to modifications to the manufacture of overbased magnesium sulphonates to reduce interactions and to compositions comprising overbased magnesium sulphonate, particularly in combination with high molecular weight dispersants and/or friction modifiers. The invention may provide stable sediment-free lubricating oil compositions (including lubricants and concentrates therefor) which can meet SG quality and the Tier II fuel economy requirement (as defined hereinbefore).

The high molecular weight dispersants which may be used in the invention include those described in EP-A-0208560. Friction modifiers are well known and include polar materials such as partial esters of fatty acids such as glyceryl mono-oleate, various straight chain acids such as oleic acid and stearic acid and derivatives of linoleic acid dimers.

This invention provides an overbased magnesium sulphonate composition comprising:
(A) at least one metal alkyl aryl sulphonate containing 1 to 3 alkyl groups, one of which alkyl groups contains an average number of carbon atoms of at least 35, preferably at least 40 while any remaining alkyl groups contain less than 10 carbon atoms, and
(B) at least one metal alkyl aryl sulphonate containing 1 to 3 alkyl groups, one of which alkyl groups contains an average number of carbon atoms of 10 to 33 while any remaining alkyl groups contain less than 10 carbon atoms.

Hereinafter the term "long chain alkyl group" is used for alkyl groups containing an average number of carbon atoms of at least 40. The term "medium long chain alkyl group" is used for alkyl groups containing an average number of carbon atoms of 10 to 33. The term "short chain alkyl group" is used for alkyl groups containing less than 10 carbon atoms. These alkyl groups need not necessarily be chains, but they can be linear, branched or cyclic alkyl groups. Usually they are saturated alkyl groups, but they can also contain some degree of unsaturation.

The composition according to the present invention is characterised by a specific size distribution of the long and medium long chain alkyl residues of the alkyl aryl sulphonates, which distribution may be called "dumb-bell distribution".

In many cases, e.g. when the sulphonic acids employed in the mixture are identical except for the size of their long and medium long chain alkyl residues, the dumb-bell distribution of the size of the alkyl residues is reflected by a similar distribution of the molecular weights. Mixtures of alkyl aryl sulphonates with a dumb-bell type molecular weight distribution are a preferred embodiment of this invention.

Surprisingly, the combination of long chain alkyl aryl sulphonates (A) and medium long chain alkyl aryl sulphonates (B) causes several beneficial effects. Compared to overbased medium long chain alkyl aryl sulphonates (B) alone the combinations (A)+(B) have improved stability when used in conjunction with high molecular weight dispersants and/or friction modifiers.

The overbased magnesium sulphonates in the composition of the invention may be prepared by any suitable overbasing process and such processes are known in the art. The composition comprising (A) and (B) may either be prepared by overbasing a mixture of suitable alkyl aryl sulphonic acids, or by separate overbasing of individual alkyl aryl sulphonic acids followed by mixing the overbased products. In the former case the mixture of sulphonic acids may either be prepared by sulphonation of mixed alkyl aromatic compounds or by admixture of separately prepared alkyl aryl sulphonic acids.

In the alkyl aryl sulphonates the sulphonic acid residue is directly bonded to an aromatic group. Preferred aromatic groups are benzene, toluene and naphthalene, benzene being especially preferred.

Component (A) must be present in the composition in an amount sufficient to cause the beneficial effects mentioned above. Usually component (A) makes up 10 to 40 wt % of the composition, the balance being (B).

It is preferred that the long chain alkyl group in component (A) is a branched alkyl group. Particularly suitable are branched long chain alkyl groups which contain an average number of carbon atoms of at least 50. Usually the branched long chain alkyl group is a mixture of alkyl groups selected from $C_{18}$ to $C_{200}$ alkyl groups. Such alkyl groups may be prepared, for example, by the polymerization of propylene or of butylenes, specifically n-butene, using known techniques.

Two different types of medium long chain alkyl groups in component (B) are preferred. In component (B1) the aryl group substituted with alkyl groups selected from $C_{15}$ to $C_{40}$ branched chain alkyl groups, the average number of carbon atoms being 15 to 33. Component (B2) is an alkyl aryl sulphonate containing $C_{10}$ to $C_{30}$ straight chain alkyl groups. Components (B1) and (B2) may be either pure compounds or mixtures of compounds. Preferably, component (B1) comprises a mixture of branched medium long chain alkyl groups while component (B2) is a substantially pure compound, i.e. all molecules of component (B2) contain the same medium long straight chain alkyl group. It is especially preferred that the medium long straight chain alkyl groups are selected from $C_{15}$ to $C_{25}$ straight chain alkyl groups. For some applications compositions comprising (A), (B1) and (B2) are particularly suitable.

Optionally components (A) and (B) contain one or two short chain alkyl groups in addition to the long chain or medium long chain alkyl groups. The preferred short chain alkyl groups are methyl and ethyl.

For different applications different proportions of components (A), (B1) and (B2) are preferred. A composition comprising 10 to 40 wt % of component (A), 10 to 60 wt % of component (B1), and 10 to 40 wt % of component (B2) is particularly suitable as a corrosion inhibiting additive to lubricant oil, i.e. for this application the use of a ternary composition is preferred.

The preferred process for preparing the overbased magnesium sulphonate of the invention comprises carbonating a reaction mixture comprising:
a) an oil-soluble sulphonic acid or sulphonate;
b) a stoichiometric excess of a magnesium compound such as an alkoxide, oxide or hydroxide;
c) oil;
d) hydrocarbon solvent such as benzene, toluene or xylene, with toluene being a preferred solvent;
e) promoter such as ketones, amines, oil-soluble carboxylic acids, amine salts or diketones
and optional additional components such as water, lower ($C_1$ to $C_5$) alkanols, or additional surfactants such as oil-soluble alkyl phenols. This process may be carried out on separate sulphonic acid or sulphonate charges to form components (A) and (B) [or (A), (B1) and (B2)] separately to be admixed subsequently, or it may be carried out on a mixture of sulphonic acids or sulphonates to form the mixed components (A) and (B) [or (A), (B1) and (B2)] directly.

The magnesium compound provides the basicity to the formed overbased magnesium sulphonate and is therefore present in excess of the amount stoichiometrically required to react with the sulphonic acid, the amount in the product dictating the total base number (TBN) of the product. It may however be introduced in stages with intervening carbonation steps.

The solvent is typically present in an amount of from 0.1 to 10 parts by weight of solvent per part of magnesium in the reaction mixture. The promoter is typically present in an amount of from 0.01 to 5 parts by weight per part of magnesium in the reaction mixture. Water may be present in an amount of from 0 to 2 parts by weight per part of magnesium in the reaction mixture.

An additional surfactant such as an alkyl phenol may be present in an amount of from 0 to 1 part by weight per part of magnesium present in the reaction mixture.

The reaction mixture is carbonated by passing carbon dioxide gas through the mixture at a typical temperature of 25° to 200° C., with a preferred range being 50° to 150° C.

After carbonation the product may be stripped to remove volatiles, and filtered to remove solids, but these operations may be carried out in either order. Further carbonation may be carried out during stripping and further oil may be added to replace material lost in stripping.

The formed product may be post-treated with a carboxylic acid and/or a glycol to improve the water tolerance and/or stability and/or foaming performance and/or seal compatibility thereof.

The overbased magnesium sulphonate preferably has a total base number (TBN) as measured by ASTM D2896 of at least 300, preferably about 400.

The overbased magnesium sulphonates may be used in compositions, e.g. lubricants and concentrates therefor, and in particular those comprising:
(i) an ashless dispersant, and particularly a high molecular weight dispersant according to EP-A-0208560 —that is, an oil additive having improved dispersancy and reduced viscosity increasing additive interactions, comprising a hydrocarbyl substituted $C_4$ to $C_{10}$ monounsaturated dicarboxylic acid producing material formed by reacting olefin polymer of $C_2$ to $C_{10}$ monoolefin having a molecular weight of from 1,500 to 5,000 and a $C_4$ to $C_{10}$ monounsaturated acid material, wherein there are an average of 1.05 to 1.25 dicarboxylic acid producing moieties per molecule of said olefin polymer used in the reaction, and/or
(ii) friction modifier, preferably even when used at the levels required to meet the Tier II fuel economy requirement (as defined hereinbefore) which may require levels of friction modifier in a concentrate of greater than 0.5 wt%, and/or
(iii) copper compound as antioxidant, and/or
(iv) a zinc dihydrocarbyl dithiophosphate, and/or
(v) other conventional additives.

Such compositions for use as crankcase lubricants will typically comprise from 0.01 to 5 wt % of overbased magnesium sulphonate, but concentrates may contain up to 50 wt % of the overbased magnesium sulphonate. The tendency for such compositions and concentrates to give interactions may be tested by blending the additives required for the composition or concentrate which are then stored at an elevated temperature, typically 54° C. or 66° C. and observing the appearance of haze/sediment.

A lubricating oil composition or concentrate may be regarded as being acceptably stable if it is clear and substantially free from haze and/or sediment after at least 3 months at 66° C. The compositions of the invention may provide a means of meeting more severe testing regimes with acceptably stable formulations and packages.

The following Examples and Test Results are given, though only by way of illustration, to show certain aspects of the invention in more detail.

EXAMPLES 1-4 AND COMPARATIVE EXAMPLE A

An overbased magnesium sulphonate was prepared by carbonation at 40-70° C. of a reaction mixture comprising:

a) a mixed alkylbenzene sulphonic acid comprising a 3:1 weight ratio of:
  (B1) A branched medium long chain mono-alkyl benzene sulphonic acid containing a mixture of alkyl residues with an average number of carbon atoms of 24; and
  (B2) A substantially pure straight chain $C_{18}$ mono-alkyl benzene sulphonic acid.
b) excess magnesium oxide
c) ethylene diamine in an amount of 0.06 parts by weight per part of magnesium in b), the ethylene diamine being introduced as a carbamate solution prepared by reacting ethylene diamine, water, methanol and carbon dioxide
d) oil.

Carbonation was continued until breakthrough and the formed product after stripping and filtration was post-treated with 2 wt % (based on the product) fumaric acid to form a nominal 400 TBN product. This product is Comparative Example A, containing approximately 47 wt % active ingredient.

The procedure was repeated replacing various amounts of the mixed sulphonic acids by higher molecular weight sulphonic acid in the reaction mixture to give products which are examples of the invention as detailed in Table 1 below.

Test Results

The formed overbased magnesium sulphonates were blended into a typical service station oil additive package including in addition to other conventional additives 18.2% of a borated PIBSA/PAM dispersant in which the polyisobutene moiety has a number average molecular weight of about 2200, 120 ppm of added copper as antioxidant and 0.75 wt % of glyceryl monooleate as friction modifier. The overbased magnesium sulphonate comprised 9.85 wt % of this package.

The packages were evaluated by storing them at 150° F. (66° C.) and observing them at regular intervals. The results are given in Table 1 below as the number of days after which incompatibility manifested itself as haze and/or sediment. A '+' sign indicates the test was still running at the number of days given without sign of incompatibility.

TABLE 1

| Example | High Molecular Weight Sulphonic Acid | %[1] | Days |
|---|---|---|---|
| A | — | — | 7[2] |
| 1 | 864 M.W. PNB S.A.[3] | 3 | 61+ |
| 2 | 864 M.W. PNB S.A. | 3 | 10 |
| 3 | 864 M.W. PNB S.A. | 3 | 12 |
| 4 | 864 M.W. PNB S.A. | 6 | 12 |

[1] as wt. percentage of 400 TBN overbased magnesium sulphonate product
[2] average of 10 repeats
[3] a (poly-n-butene) substituted benzene sulphonic acid wherein the poly-n-butene (PNB) moiety has a number average molecular weight of 864.

We claim:

1. A lubricating oil meeting the SG quality level in the American Petroleum Institute Engine Service Categories for service station oils and/or providing American Petroleum Institute Tier II fuel economy performance, which lubricating oil comprises an overbased magnesium sulphonate composition comprising:
  (A) At least one magnesium alkyl aryl sulphonate containing 1 to 3 alkyl groups, one of which alkyl groups contains an average number of carbon atoms of at least 40 therefor while any remaining alkyl groups contain less than 10 carbon atoms, and
  (B) at least one magnesium alkyl aryl sulphonate containing 1 to 3 alkyl groups, one of which alkyl groups contains an average number of carbon atoms of 10 to 33 while any remaining alkyl groups contain less than 10 carbon atoms.

2. The lubricating oil according to claim 1, in which the aromatic group in the alkyl aryl sulphonates is a benzene, toluene or naphthalene group.

3. The lubricating oil according to claim 1, in which component (A) makes up 10 to 40 wt % of the overbased magnesium sulphonate composition, the balance being (B).

4. The lubricating oil according to claim 1, in which one of the alkyl groups in component (A) is a branched alkyl group which contains an average number of carbon atoms of at least 50.

5. The lubricating oil according to claim 1 in which the component (B) is selected from the group consisting of (B1) sulphonates containing a $C_{15}$ to $C_{40}$ branched chain alkyl group, having an average number of carbon atoms of 15 to 33, (B2) sulphonates containing a $C_{10}$ to $C_{30}$ straight chain alkyl group, and mixtures thereof.

6. The lubricating oil according to claim 5, in which (B2) contains $C_{15}$ to $C_{15}$ straight chain alkyl groups.

7. The lubricating composition according to claim 5, comprising 10 to 40 wt % of component (A), 10 to 60 wt % of component (B1), and 10 to 40 wt % of component (B2).

8. The lubricating oil according to claim 1, in which the overbased magnesium sulphonate is post-treated with a carboxylic acid and/or a glycol to improve the water tolerance and/or stability and/or foaming performance and/or seal compatibility thereof.

9. The lubricating oil according to claim 1, in which the overbased magnesium sulphonate composition has a total base number as measured by ASTM D2896 of at least 300.

10. The lubricating oil according to claim 1 which further comprises at least one additive selected from the group consisting of an ashless dispersant, a friction modifier, a copper compound as antioxidant, a zinc dihydrocarbyl dithiophosphate, other conventional additives.

11. The lubricating oil according to claim 1, which contains from 0.01 to 5 wt % of overbased magnesium sulphonate.

12. A concentrate for use in formulating a lubricating oil which comprises up to 50 wt % of an overbased magnesium sulphonate composition comprising:
(A) at least one magnesium alkyl aryl sulphonate containing 1 to 3 alkyl groups, one of which alkyl groups contains an average number of carbon atoms of at least 40 while any remaining alkyl groups contain less than 10 carbon atoms, and
(B) at least one magnesium alkyl aryl sulphonate containing 1 to 3 alkyl groups, one of which alkyl groups contains an average number of carbon atoms of 10 to 33 while any remaining alkyl groups contain less than 10 carbon atoms.

* * * * *